United States Patent

Maeda et al.

[11] 4,306,260
[45] Dec. 15, 1981

[54] DUAL MAGNETIC HEAD MOUNT

[75] Inventors: Munesige Maeda, Odawara; Hiroshi Nishida, Kanagawa; Yasuo Akiyama; Masaaki Hayashi, both of Odawara, all of Japan

[73] Assignee: Hitachi, Ltd., Tokyo, Japan

[21] Appl. No.: 97,706

[22] Filed: Nov. 27, 1979

[30] Foreign Application Priority Data

Dec. 1, 1978 [JP] Japan .................................. 53-147894

[51] Int. Cl.³ .................... G11B 21/12; G11B 21/16; G11B 5/54
[52] U.S. Cl. ...................................... 360/105; 360/104
[58] Field of Search .................. 360/104, 105, 103, 99

[56] References Cited

U.S. PATENT DOCUMENTS

| 4,151,573 | 4/1979 | Tandon et al. | 360/104 |
| 4,209,813 | 6/1980 | Bryer | 360/105 |
| 4,250,530 | 2/1981 | Yang | 360/105 |

*Primary Examiner*—Robert S. Tupper
*Attorney, Agent, or Firm*—Craig and Antonelli

[57] ABSTRACT

A magnetic head for recording and reproducing signals by the cores incorporated in two sliders disposed on both sides of a flexible magnetic disc, wherein the two sliders are supported respectively on gimbal flexures having omnidirectional degrees of freedom, one of the two sliders is pressed against the flexible magnetic disc by means of a loading spring, and the other slider is fixed in the optimal position relative to the disc in the direction perpendicular to the surface of the disc.

5 Claims, 5 Drawing Figures

F I G. 2
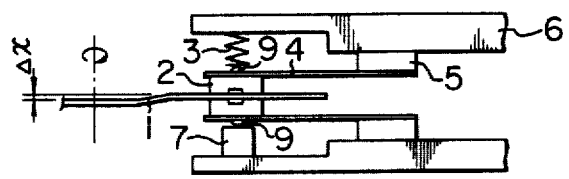
F I G. 3
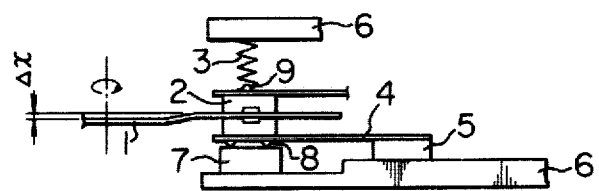

DUAL MAGNETIC HEAD MOUNT

FIELD OF THE INVENTION

This invention relates to the structure of a magnetic head mount.

BRIEF DESCRIPTION OF THE DRAWINGS

FIG. 2 shows in side view a magnetic head mount as an embodiment of this invention.

FIG. 3 shows in side view a magnetic head mount as another embodiment of this invention.

DESCRIPTION OF THE PRIOR ART

Figure 1:
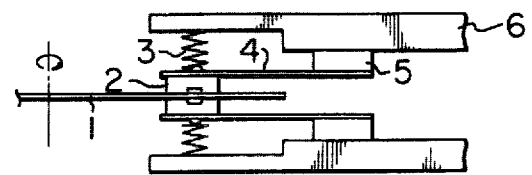
FIG. 1 shows in side view a conventional magnetic head mount.

FIG. 1 shows the structure of a conventional magnetic head mount.

A flexible magnetic disc (hereinafter referred simply as magnetic disc) 1 is encased in a jacket (not shown) in the form of an envelope and fixed to a spindle (not shown) to be rotated therewith.

The magnetic disc 1 is interposed between two sliders 2 and the recording and reproducing of information is effected by the combination of a core (not shown) and a winding (not shown) incorporated in each slider 2.

The slider 2 is fastened by, for example, an adhesive agent to a gimbal flexure 4 (hereafter referred to simply as gimbal) made of a thin (e.g. 0.05 mm) metal plate. The slider 2 is given omnidirectional degrees of freedom by the function of the gimbal 4 so as to be kept in stable contact with the surface of the magnetic disc 1.

Further, the slider 2 is urged against the magnetic disc 1 by means of a loading spring 3 to obtain a desired contact pressure between them.

The gimbal 4 is attached by means of a spacer 5 to an arm (rigid body) 6, the location of the gimbal 4 being suitably determined according to the design. The two sliders 2 serve as pads for their opposite counterparts respectively, to obtain a stable surface contact, that is, to maintain a good recording and reproducing characteristic. Accordingly, if one of them becomes unstable for some cause, the other will be unstable, too.

As described above, the basic operating principle of the conventional structure is that the two sliders can completely follow the fluctuation of the flexible magnetic disc in the direction perpendicular to the surface of the disc.

In practice, however, it is difficult to set the urging forces of the loading springs 3 to be exactly the same, to attach the magnetic disc to the spindle without geometrical deviations from the standard position according to the design so that the magnetic disc may not undulate during rotation, and to locate the sliders 2 at the exactly balanced positions. In some cases, therefore, the deviation of the position of the magnetic disc 1 from the center position between the sliders 2 is so large that the degrees of freedom of the sliders cannot compensate for the deviation. In such cases, it will be impossible to obtain a normal recording and reproducing characteristic.

SUMMARY OF THE INVENTION

The object of this invention is to eliminate the problems incidental to the conventional structure and to provide a magnetic head mount capable of obtaining a normal recording and reproducing characteristic irrespective of the non-uniformity of the constituent parts and/or the fabricating manipulation.

According to one of the features of this invention, one of the sliders provided on both sides of the magnetic disc has omnidirectional degrees of freedom and the other slider has an omnidirectional or a one-directional freedom, with its surface to be kept in contact with the magnetic disc, fixed at the optimal level, so that the magnetic disc is kept at the fixed level during rotation.

DESCRIPTION OF THE PREFERRED EMBODIMENT

Now, this invention will be described by way of example with the aid of the attached drawings.

FIG. 2 shows in side view a magnetic head as an embodiment of this invention.

Of two sliders 2 disposed on both sides of a magnetic disc 1, the upper one shown in FIG. 2 has the same structure and function and performs the same operation, as the slider for the conventional magnetic head described above. Namely, the upper slider 2 has, by the function of a gimbal 4, omnidirectional degrees of freedom to obtain a stable surface-to-surface contact with the magnetic disc 1 and a predetermined contact pressure between the upper slider 2 and the magnetic disc 1 can be maintained by the urging force of a loading spring 3.

The lower slider 2 also has omnidirectional degrees of freedom, through the function of a gimbal 4, to obtain a stable surface-to-surface contact with the magnetic disc 1.

The position or level of the lower slider 2 relative to the magnetic disc 1, in the direction perpendicular to the disc 1 is fixed since the lower slider 2 is supported on a stopper 7 provided on a lower arm 6.

Although the optimal level of the lower slider 2 is determined depending on the degree of deformation of the surface of the magnetic disc 1 (or undulation of disc surface during rotation) and the effective life of the lower slider 2 against its wear, the lower slider 2 is usually located in such a manner that the upper surface of the lower slider 2 is higher by $\Delta x$ (e.g. about 0.3 mm) than the reference horizontal level of the magnetic disc 1.

As shown in FIG. 2, the lower slider is fixedly disposed with the displacement of $\Delta x$ relative to the standard level of the magnetic disc 1 and therefore even when the magnetic disc 1 has a deformation (or undulating surface or undulation of surface during rotation), the disc 1 is kept in contact with the lower slider 2 by the constant urging force of the upper slider 2.

Further, each of the upper and lower sliders 2 has degrees of freedom in both rolling and pitching directions about a pivot 9 so that each slider can follow up a small local deformation in the magnetic disc 1.

Moreover, since the lower slider 2 is kept at a fixed level, the contact pressure exerted between the magnetic disc 1 and each slider 2 by the loading spring 3 is always constant.

FIG. 3 shows another embodiment of this invention, in which the same reference numerals are applied to equivalent parts as in FIG. 2.

The difference of the embodiment shown in FIG. 3 from the previous embodiment shown in FIG. 2 is that two pivots 8 are provided on the lower surface of the lower slider 2 so as to cancel the degree of freedom of the lower slider 2 in the rolling (or lateral) direction while only the degree of freedom in the pitching direction perpendicular to the rolling direction is maintained. Alternatively, the lower slider 2 may have only the degree of freedom in the rolling direction and this alternative constitution may be more advantageous than the structure shown in FIG. 3, depending on the precisions of parts and in assembling and the magnitude of the urging force of the loading spring. Also, similar effects can be obtained by providing the pivots on the upper surface of the stopper 7.

Next, a mechanism for loading the magnetic head upon the disc and a mechanism for positioning the head relative to the track of the disc will be explained.

Figure 4:
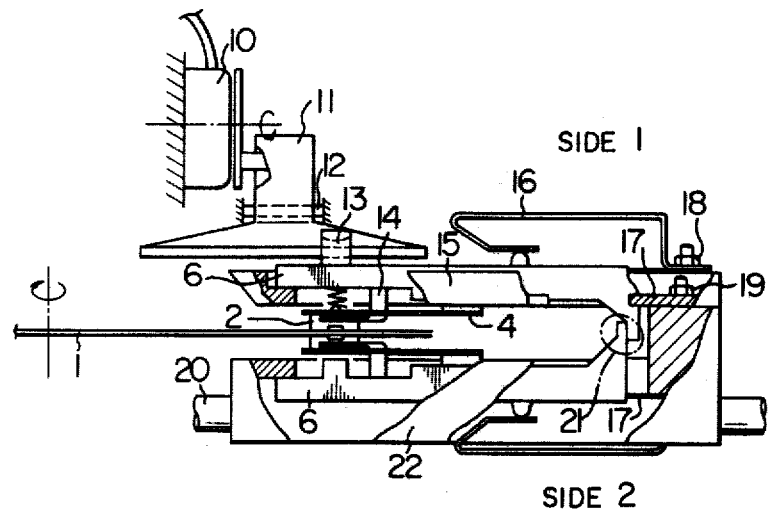
FIG. 4 shows in side view a magnetic head loading mechanism.

FIG. 4 shows a mechanism for bringing the sliders 2 to the ON or OFF state relative to the disc 1, in which the sliders 2 are in the ON state.

A carriage 22 is guided by a shaft 20 and movable in the radial direction of the disc 1. A carriage guide 15 is attached to the carriage 22 by means of bolts and nuts 19. Swing arms 6 on the sides 0 and 1 are respectively urged against and fixed to the carriage 22 and the carriage guide 15 by means of support springs 16. Plate springs 17 partially embedded in the swing arms 6 by molding and the support springs 16 are screwed down to the carriage 22 by bolts and nuts 19 and 18 respectively.

The sliders 2 are brought to the OFF state relative to the disc 1 through the following series of operations. When the current flowing through a rotary solenoid 10 fixed on the base, for bringing the sliders 2 to the ON state is interrupted, the solenoid 10 is rotated in the direction indicated by an arrow shown in FIG. 4, by the restorative force of a spring incorporated in the solenoid 10. A bail 11 which is rotatable about a shaft 12, is rotated in interlock with the rotation of the solenoid 10 so that the edge of the bail 11 engaged with a hook 13 lifts up the hook 13. Since the hook 13 is a part of the swing arm 6 on the side 1, the swing arm 6 on the side 1 is swung up, with the plate spring 17 bent upward. The swing arm 6 on the side 1 has a hook 14 and therefore the hook 14 lifts up the gimbal 4. Accordingly, the slider 2 attached to the gimbal 4 is lifted up to bring the upper slider 2 to the OFF state relative to the disc 1.

On the other hand, when the swing arm 6 on the side 1 is swung up with the plate spring 17 bent upward, the swing arm 6 on the side 0 is swung down, with the associated plate spring 17 bent downward, by a cam mechanism 21. As a result, in like manner, the hook 14 brings the lower slider 2 to the OFF state.

The sliders 2 are brought to the ON state relative to the disc 1, through the sequence of the operations opposite to the above series of operations. Namely, when the current to bring the sliders 2 to the ON state flows through the rotary solenoid 10, the rotary solenoid 10 is rotated in the direction opposite to that indicated by the arrow shown in FIG. 4. Accordingly, the bail 11 is disengaged from the hook 13 so that the swing arms 6 on the sides 1 and 0 are urged respectively against the carriage guide 15 and the carriage 22 by the restorative forces of the support springs 16. Consequently, the sliders 2 assume the ON state relative to the disc 1 while the hooks 14 are disengaged from the gimbal 4 so as not to deprive the sliders 2 of their degrees of freedom.

Figure 5:
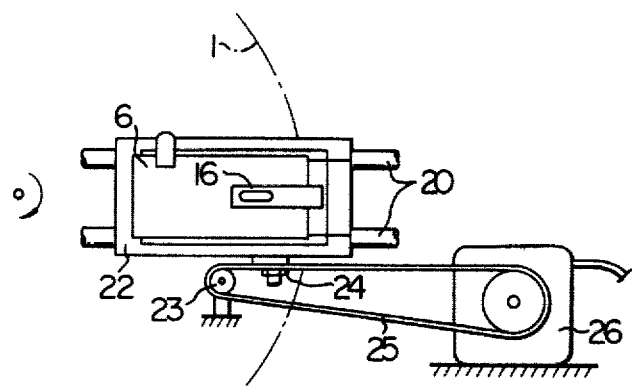
FIG. 5 shows in plan a mechanism for positioning the magnetic head.

FIG. 5 shows a mechanism for positioning the magnetic head relative to the track of the magnetic disc.

A head carrier carrying a magnetic head thereon is guided by the two shafts 20 and can be moved in the radial direction of the disc 1. The head carrier is coupled to a steel belt 25 by a bolt and nut 24. The steel belt 25 rotatably connects a roller 23 with a step motor 26 and when a predetermined signal for positioning the head relative to the track of the disc is supplied to the step motor 26, the step motor 26 is rotated until it reaches a desired position. Accordingly, the head is shifted to the corresponding desired position relative to the disc.

As described above, according to this invention, the following advantageous result can be obtained.

Namely, since the sliders have the degrees of freedom in motion in the rolling and pitching directions, since the position of the magnetic disc in the direction perpendicular to the surface of the disc is restricted by the slider of which the position is fixed, and since the contact pressure between the sliders and the disc is kept constant, then a stable surface-to-surface contact can be maintained between the sliders and the disc so that the writing and reading characteristics are stabilized.

What we claim is:

1. A mount for magnetic heads for recording and reproducing signals by the cores incorporated in two sliders disposed on respective sides of a flexible magnetic disc, comprising
   gimbal flexures for providing said two sliders with omnidirectional degrees of freedom so that said sliders may be kept in a stable surface-to-surface contact with said flexible magnetic disc;
   loading spring means for causing one of said two sliders to be kept in a surface-to-surface contact with said disc; and
   means for fixing the other slider in an optimal position relative to said disc in the direction perpendicular to the surface of said disc.

2. A mount for magnetic heads for recording and reproducing signals by the cores incorporated in two sliders disposed on respective sides of a flexible magnetic disc, comprising
   gimbal flexures for providing said two sliders with omnidirectional degrees of freedom so that said sliders may be kept in a stable surface-to-surface contact with said flexible magnetic disc;
   swing arms by which said gimbal flexures are fixedly supported and by means of which said sliders can be made to move toward and away from said flexible magnetic disc;
   loading spring means for causing one of said two sliders to be kept in a surface-to-surface contact with said disc; and
   means for fixing the position of the other slider relative to said disc in the direction perpendicular to the surface of said disc, by supporting said other slider on a pivot provided on a stopper attached to one of said swing arms on which said other slider is fixed via said gimbal flexure.

3. A mount magnetic heads for recording and reproducing signals by the cores incorporated in two sliders disposed on respective sides of a flexible magnetic disc, comprising
   gimbal flexures for providing said two sliders with omnidirectional degrees of freedom so that said sliders may be kept in a stable surface-to-surface contact with said flexible magnetic disc;

swing arms by which said gimbal flexures are fixedly supported and by means of which said sliders can be made to move toward and away from said flexible magnetic disc;

loading spring means for causing one of said two sliders to be kept in a surface-to-surface contact with said disc; and means for fixing the position of the other slider relative to said disc in the direction perpendicular to the surface of said disc, by supporting said other slider on pivots provided on a stopper attached to one of said swing arms on which said other slider is fixed via said gimbal flexure, said pivots being so arranged on said stopper that said other slider may have a degree of freedom only in the pitching direction.

4. A mount magnetic heads for recording and reproducing signals by the cores incorporated in two sliders disposed on respective sides of a flexible magnetic disc, comprising gimbal flexures for providing said two sliders with omnidirectional degrees of freedom so that said sliders may be kept in a stable surface-to-surface contact with said flexible magnetic disc;

swing arms by which said gimbal flexures are fixedly supported and which cause said sliders to come near to and to recede from said flexible magnetic disc;

loading spring means for causing one of said two sliders to be kept in a surface-to-surface contact with said disc; and means for fixing the position of the other slider relative to said disc in the direction perpendicular to the surface of said disc, by supporting said other slider on pivots provided on a stopper attached to one of said swing arms on which said other slider is fixed via said gimbal flexure, said pivots being so arranged on said stopper that said other slider may have a degree of freedom only in the rolling direction.

5. A mount as claimed in claim 1, 2, 3 or 4, wherein said other slider is so located that the upper surface of said other slider is slightly displaced with respect to the reference plane assumed in said magnetic disc.

* * * * *